US010262536B2

(12) United States Patent
Bezak et al.

(10) Patent No.: US 10,262,536 B2
(45) Date of Patent: Apr. 16, 2019

(54) METHOD AND APPARATUS FOR CHARGING STATION MONITORING

(71) Applicant: Ford Global Technologies, LLC, Dearborn, MI (US)

(72) Inventors: Jonathon Bezak, Royal Oak, MI (US); Owen Carpenter, Ann Arbor, MI (US); Michael Platt, Monroe, MI (US); Damian Stone, Novi, MI (US); Gregory Jerome Gunnels, Goodrich, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 593 days.

(21) Appl. No.: 14/729,133

(22) Filed: Jun. 3, 2015

(65) Prior Publication Data

US 2016/0358472 A1    Dec. 8, 2016

(51) Int. Cl.
| | |
|---|---|
| *G06Q 10/00* | (2012.01) |
| *G08G 1/133* | (2006.01) |
| *H04W 4/02* | (2018.01) |
| *G06Q 10/02* | (2012.01) |
| *G06Q 20/08* | (2012.01) |
| *B60L 11/00* | (2006.01) |
| *B60L 11/18* | (2006.01) |
| *G06Q 20/32* | (2012.01) |
| *G07F 15/00* | (2006.01) |

(52) U.S. Cl.
CPC ............ *G08G 1/133* (2013.01); *B60L 11/007* (2013.01); *B60L 11/1824* (2013.01); *B60L 11/1838* (2013.01); *G06Q 10/02* (2013.01); *G06Q 20/085* (2013.01); *G06Q 20/3224* (2013.01); *G07F 15/005* (2013.01); *H04W 4/023* (2013.01); *B60L 2230/40* (2013.01); *B60L 2240/70* (2013.01); *Y02T 90/12* (2013.01); *Y02T 90/128* (2013.01)

(58) Field of Classification Search
CPC .................................. H02J 7/00; G06Q 30/06
USPC .............................. 320/109; 705/26.61, 27.1
See application file for complete search history.

(56) References Cited

U.S. PATENT DOCUMENTS

| | | | |
|---|---|---|---|
| 8,417,598 B2* | 4/2013 | Pinkusevich | ....... B60L 11/1816 320/109 |
| 2010/0211643 A1 | 8/2010 | Lowenthal et al. | |
| 2011/0202476 A1* | 8/2011 | Nagy | .................. B60L 11/1816 705/412 |
| 2012/0233027 A1 | 9/2012 | Tate, Jr. et al. | |
| 2014/0074523 A1* | 3/2014 | Turner | .................. G06Q 10/02 705/5 |
| 2014/0125279 A1* | 5/2014 | Juhasz | ...................... H02J 7/00 320/109 |

* cited by examiner

*Primary Examiner* — Rokib Masud
(74) *Attorney, Agent, or Firm* — Jennifer Stec; Brooks Kushman P.C.

(57) ABSTRACT

A system includes a processor configured to receive indication that a chargeable vehicle is within proximity to a known charging point. The processor is also configured to determine if the charging point is available for immediate use. The processor is further configured to notify a vehicle driver if the charging point is available for immediate use and offer an option to receive notification when a charging point is available for use if the charging point is not available for immediate use.

15 Claims, 4 Drawing Sheets

METHOD AND APPARATUS FOR CHARGING STATION MONITORING

TECHNICAL FIELD

The illustrative embodiments generally relate to a method and apparatus for electric vehicle charging station monitoring.

BACKGROUND

With the ever-increasing popularity of electric vehicles (EVs) and hybrid electric vehicles (HEVs), many companies and public parking structures are responding by installing a few charging points in or near their locations. Since these charging points are typically few in number, drivers frequently have to simply arrive at the location and drive by the charging points to determine charging point availability. Because charging typically takes hours to complete, if a charging point is not currently available, drivers cannot simply wait for one to become available. If the drivers want to check on availability, they must re-visit the charging points throughout the day, to see if a spot is open.

In one present implementation, an electric vehicle charging station network server manages a plurality of charging stations and receives subscriber notification message preferences for a subscriber (e.g., electric vehicle operator) which indicate one or more events of interest for whiche the subscriber wishes to receive notification messages. A set of one or more contact points associated with the subscriber is also received. The server authorizes the subscriber to use one of the plurality of charging stations. The server receives data associated with the subscriber from that charging station which indicates that a charging session has been established for an electric vehicle associated with the subscriber. The server detects an event of interest for the subscriber and transmits a notification message for that event to at least one of the set of contact points associated with the subscriber.

SUMMARY

In a first illustrative embodiment, a system includes a processor configured to receive indication that a chargeable vehicle is within proximity to a known charging point. The processor is also configured to determine if the charging point is available for immediate use. The processor is further configured to notify a vehicle driver if the charging point is available for immediate use and offer an option to receive notification when a charging point is available for use if the charging point is not available for immediate use.

In a second illustrative embodiment, a system includes a processor configured to manage a queue of entities desiring to receive notification when a charging point to which the queue corresponds is available for use. The processor is also configured to determine if the charging point is available for use and notify an entity in the queue when the charging point is determined to be available for use. The processor is further configured to receive acceptance of charging point usage from the notified entity and reserve the charging point for use by the notified entity upon receipt of the acceptance.

In a third illustrative embodiment, a system includes a processor configured to establish communication between a beacon-detecting device and a beacon. The processor is also configured to determine that a charging point is in use based on the established communication. Also, the processor is configured to designate the charging point as in-use until communication between the beacon-detecting device and the beacon is no longer present.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
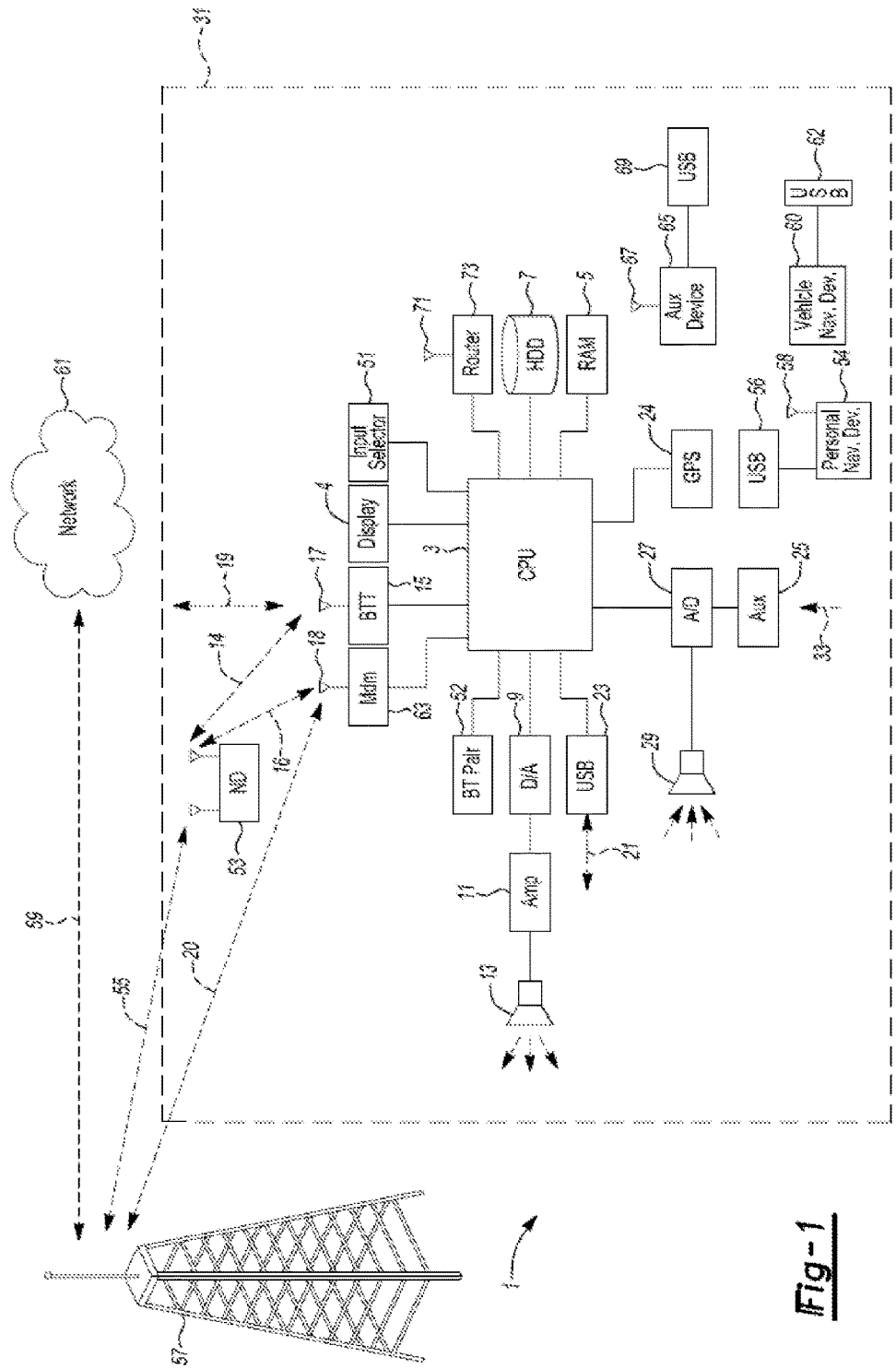
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In the illustrative examples, a user can enter a parking lot or other locale containing charging stations, and the illustrative systems and processes can notify the user of any available charging points. If there are not any charging points available, the user can register to receive a notification and/or queue up for charging points when available. Further, the charging stations themselves can be equipped with smart processes that determine when the points are in use and which points are in-use or available. Through the illustrative examples and the like, users can efficiently utilize a local charging point network with limited inconvenience.

Figure 2:
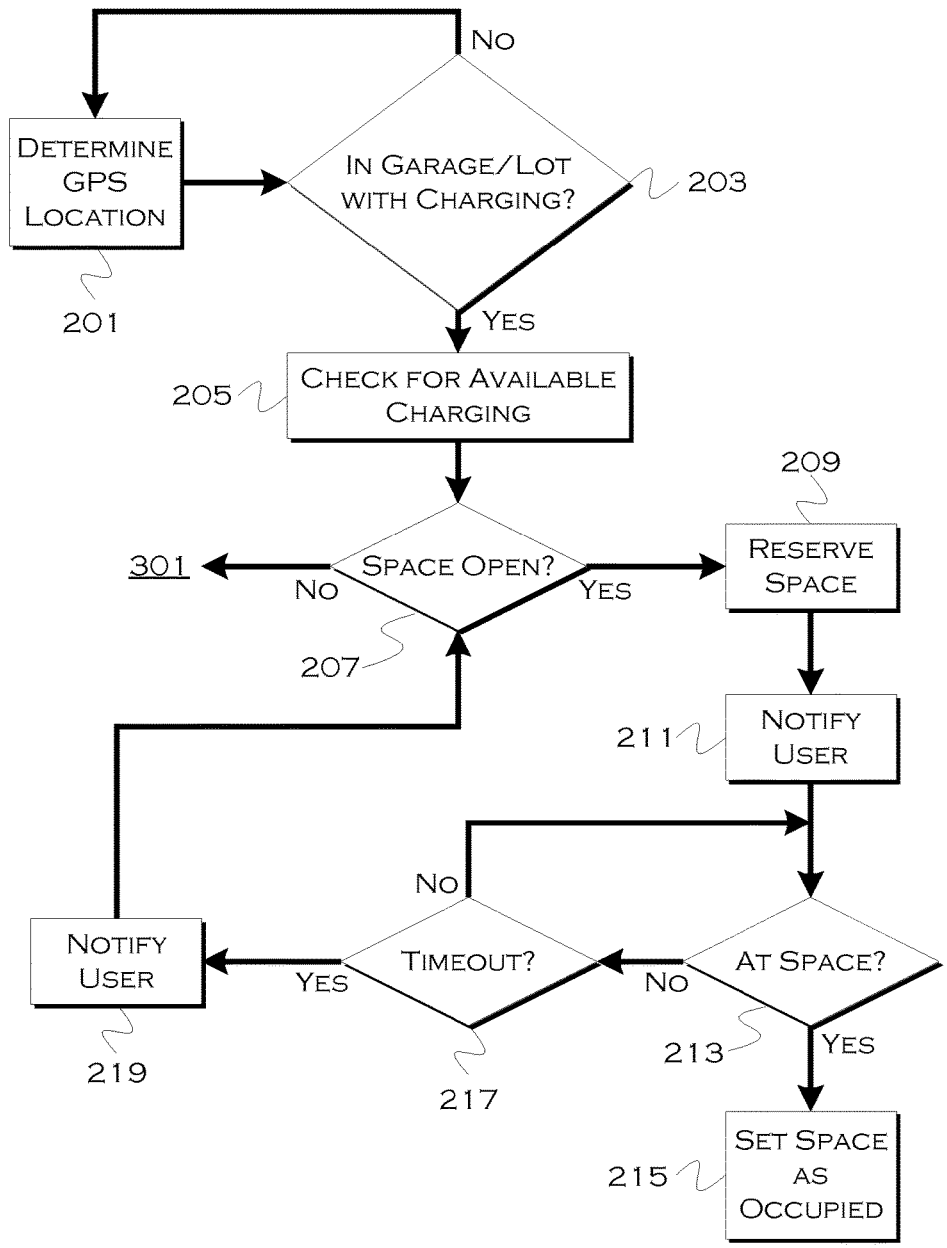
FIG. 2 shows an illustrative process for charging point notification.

FIG. 2 shows an illustrative process for charging point notification. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user arrives at a location with one or more charging points that may be available. A mobile application or an in-vehicle application can communicate with a cloud-based service or a local wireless network to transmit charging requirements and current location, so that it can be known when rechargeable vehicles arrive at a particular location equipped with charging capabilities. Since it isn't always apparent that charging potential exists (i.e., a few stations may be located at a particular level of a parking garage), wireless communication of this sort can be used to identify charging opportunities.

In this particular illustrative embodiment, the process determines a present GPS location of a mobile device or vehicle 201. If the vehicle (or device in the vehicle) is located in proximity to a charging location, such as a garage with charging points 203, the process will proceed. Otherwise, the process can continue to check for proximity to charging opportunities.

In at least one example, the availability of charging may be presented once a vehicle actually enters a coordinate bounded or geo-fenced area defining a garage or lot. This can prevent false positives for vehicles traveling on a road, and may be useful as charging points become more prevalent. On the other hand, it may be desirable to transmit charging point availability to road-traveling vehicles, as a way to incentivize a stop at a location, since the user may be somewhat agnostic with regards to a particular stop, but may be lured into a shopping location by the ability to charge while they shop.

Once the process determines that the vehicle is located proximate to a charging point 203, the process will then check to see if any charging points are actually available 205 (i.e., not in use or scheduled for imminent use). If there are any available charging points located within the structure/lot 207, the process can reserve a space temporarily 209 while notifying a user of the space availability 211.

In this example, the reservation may only persist for a limited time, but is made so that the user doesn't respond to the notification and arrive at the charging point to find the space already occupied. The actual charging installations themselves are frequently unmanned, so it is conceivable that a vehicle could occupy a charging point in the interim between notification and arrival at the charging point. In such instances, measures such as those below with respect to FIG. 5 can be taken to ensure participation in a queuing scheme. In other models, the charging points may be provided on a first-come-first-served basis, and mere notification without reservation may be provided.

Until the user arrives at the designated space 213 (limited purpose local directions within the structure or lot can be provided to direct the user to the space—e.g., "space #3 at the western edge of the lot" or "space #3 on the third level of the garage"), the process will continue to hold the reservation for a timeout period 217. This timeout is not necessary, but may be useful if a number of vehicles are arriving, some of which may or may not want to use charging capabilities, and the number of vehicles wanting to use charging exceeds the number of available charging points.

The reservation can take a number of forms. In one embodiment, a sign or indicia that the spot is reserved can be provided. In another embodiment, the space can be considered "in use" while a reservation persists, so that other pending users are not notified until the reservation expires. Alternatives include limiting power to the space as described herein and other suitable methods of reserving the space.

Once the user has arrived at the charging location 213, the process can set the space as occupied 215. The actual use and occupation of a space can also be determined as later discussed with respect to FIG. 4. If no charging locations are available when a user arrives at a location, the process shown in FIG. 3 by illustrative example can be used to register for a notification when a space becomes available.

While the illustrative examples are directed at spaces equipped with charging points, it is noted that the concepts can be generally applied to designate available parking spaces as well. Other than the considerations about providing or preventing power-flow, parking spaces within a lot can be provided with the detection and reporting processes described herein, or similar processes. Similarly, reservation processes and notification processes can be provided for these spaces.

Figure 3:
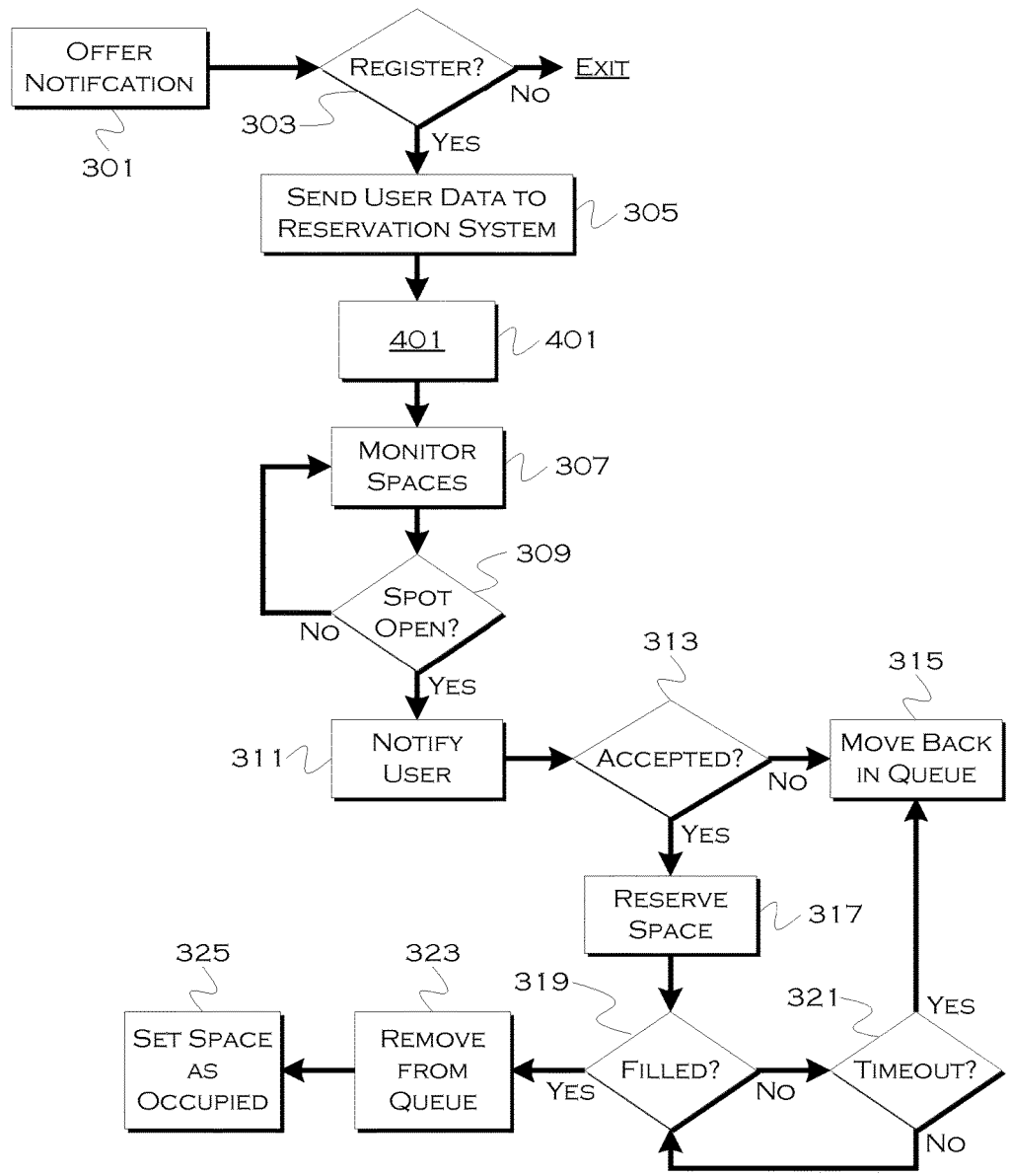
FIG. 3 shows an illustrative notification registration process.

FIG. 3 shows an illustrative notification-registration process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user has arrived at a location where no charging points are available for current use. Since the user may wish to charge at some point during the day, and may not wish to frequently visit the charging points to see if one has opened up, the registration and notification process shown by illustrative example allows for a user (via, for example, email, a mobile app, a text, etc) to be notified when a charging point becomes available.

In this example, the process offers to notify the user when a spot becomes available 301. If any information is known about the likely length of wait, it could also be provided at this time, to avoid unnecessary registration and notification (e.g., if fifty vehicles are queued up before the user, the user may forego registration for notification, since availability is highly limited). If the user elects to register for notification 303, the process sends user information to a reservation system 305.

The reservation system can track charge point usage and queue users for usage, as well as sending out notification when spaces become available. Through communication with the charging points, the system can have a very accurate snapshot of current usage, and through tracking registered users, confirmations, acceptances, etc., the system can efficiently notify and queue users for use of the charging points, with nominal inconvenience to the various users.

In this example, a queuing process 401 takes place after the user data is sent to the reservation system. This allows for ordered notification of users. In other models, a first-come-first-served model might be preferred, with all currently registered users being notified when a space is available. In the latter model, once the space is filled the users may again be notified, to avoid a user heading to a vehicle to obtain a space that has subsequently become filled.

Here, although shown as a single process, the steps from 401 and 307-325 may be performed by the reservation system, which can be provided as a part of or separate from the registration process. In this example, the process will monitor any spaces for use 307, and when a spot is available and open 309, the process will notify one or more users 311.

In this illustrative model, the spot notifies a next user in a queue 311, and if the user accepts the use of the spot (e.g., indicates that they will shortly move their vehicle to the spot), the process will reserve the space for that user 317. Again, this can be a temporary reservation, contingent on prompt utilization of the available space. If the user rejects the available spot (e.g., the user is busy and cannot move the vehicle, or does not wish to charge), the user is then moved back in the queue 315 (any number of suitable queue movements are contemplated, based on the desired model, such as moving the user back N places in line, moving the user to the back of the line, etc). At this point, notification for a next-user in line can take place.

As long as the user has accepted the reservation 313 and any timeout period has not passed 321, the process will check to see if the user has occupied the space 319. Once the space is filled by the user, the user will be removed from the queue 323 and the space will be set as occupied by the process 325. If the timeout passes, in this example, the user will be moved back a suitable amount in the queue.

It is possible that varied queuing methods will be used based on user response to a notification. For example, without limitation, if a user declines a space, the user could be moved to the end of a line, but if a user accepts a space and then cannot make it to the space in the defined time period, the user may only be moved back a few spaces or one space in line. In another example, if the user's location (as indicated by mobile device GPS coordinates, for example) indicates that the user is attempting to fulfill the reservation, the timeout period may be extended to provide sufficient time to fill the space.

Figure 4:
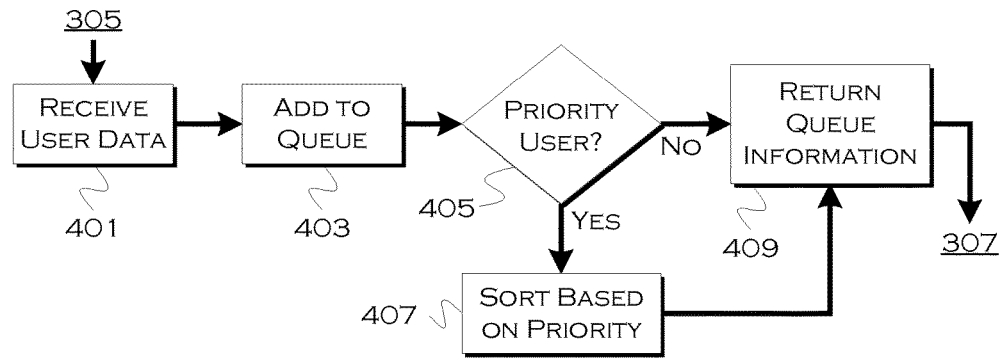
FIG. 4 shows an illustrative queuing process.

FIG. 4 shows an illustrative queuing process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This is an example of a queuing process that might be used in a high demand area or when limited charging points are available and more vehicles desire the points than can use them at a single time.

Here, user data 401 is received, which can include, but is not limited to, a vehicle identifier, a beacon identifier or device identifier (more on this in FIG. 5), a user ID or any other information needed to identify a user. A means of contact may also be received, indicating whether the user prefers, for example, mobile messaging through an app, a text message, an email, etc, when a space becomes available. The user is then added to an existing queue 403.

In this example, users may pay or otherwise have a premium designation 405. This could provide for opportunities to move ahead in a queue. This could be used to recover some of the cost of providing the charging points, or, for example, certain office space in a building could be rented with premium access to charging. In other models, vehicles on very low charge could be given priority access to charging points. Or, for example, managerial or standout employees could be given priority.

If a user has some form of priority associated therewith 405, the process may sort based on the premium 407. This can result in a re-ordering of the queue, and will give priority as appropriate to the queue members. Of course, such a sort is not necessary, and simple first-in-first-out queuing can also be used. Once any sorting is done and/or the user is added to the queue, this process can return the ordered queue for notification priority usage 409.

Figure 5:
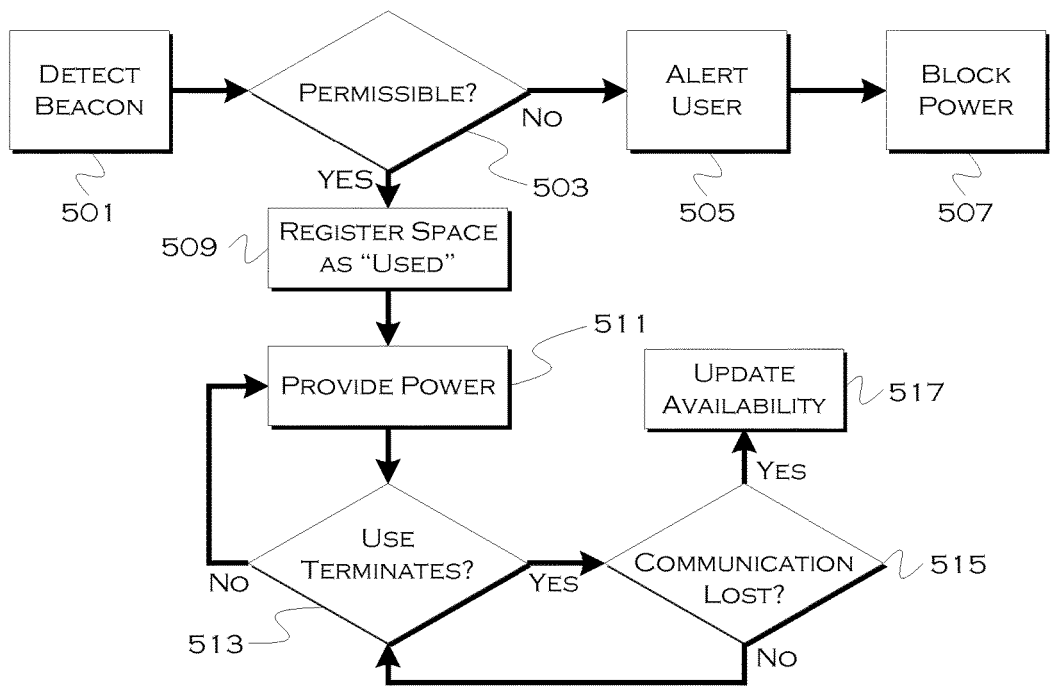
FIG. 5 shows an illustrative usedetection process.

FIG. 5 shows an illustrative use-detection process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 5, a station is capable of detecting the presence of a user. In this example, power provision and power use prevention is provided based on a reservation system, although the example could also be used to merely indicate usage. Some models for detecting usage include, but are not limited to: 1) a mobile application detects a beacon at the charging point and updates availability (indicating usage, for example) in the managing system; 2) a mobile application detects a beacon at the charging point and allows the user to confirm usage before updating the managerial system; 3) a BLUETOOTH chip on the vehicle detects the beacon at the charging point and updates the managerial system indicating usage; and 4) a beacon provided to the vehicle or mobile device is detected by the charging point (via BLUETOOTH for example) and the charging point updates the managerial system.

Here, the process detects a beacon provided to at least one of the entities involved in the power transaction (e.g., at the charging point or at the vehicle) 501. In this example, the process also determines if usage is presently permissible 503. This permissibility determination relates to the reservation system, and power can be denied 507 if an improper user is attempting to utilize the power. The present user attempting to use the system and/or the reserved user may be notified 505 of the denial or attempted usage respectively. This can allow an unregistered user a chance to register, and a reserved user a chance to acquiesce to the usage (such as if the "proper" user can't make it to the charging point and no other users are queued).

If the beacon and any identifying information obtainable through communication between the charging point and vehicle/mobile device indicates that the user is permitted to use the charging point 503, or, for example, if there is not presently a queue, meaning anyone can use the point, the process will then register the space as under use 509, which can update the managerial system for later users. Power is also provided to the point 511, which ensures that proper users receive power. Again, if there was no queuing, the power restriction and power provision may simply be skipped, and power can simply be provided to any approaching vehicle. Even in this case, however, use of the charging point might be noted for notification purposes.

Once use of the charging point has terminated 513, the process may perform a further check to ensure that communication with the beacon has been lost 515 (i.e., the user has moved out of range of the beacon). This extra step, although not necessary, can assist in ensuring that any interruption in charging usage wasn't due to a temporary disconnection, and that charging had actually completed for that user. Once charging is complete, with the additional user-out-of-range verification if desired, the process can update the space as now available 517 for notification purposes by the managerial system.

Through use of the illustrative embodiments and the like, limited power charging points can have near-continuous and efficient usage by a large number of candidate vehicles. This also can assist in limiting user-inconvenience, and generally provide a more favorable experience with regards to public charging point provision and usage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive indication that a chargeable vehicle is within GPS coordinates defining a charging point area;
determine if the charging point is available for immediate use, responsive to the indication;
notify a vehicle driver of an immediately available charging point, including providing localized guidance to the charging point; and
offer an option to receive charging-point availability notification when the charging point is not available for immediate use.

2. The system of claim 1, wherein the processor is further configured to receive acceptance of charging point usage from the vehicle driver following notification that the charging point is available for immediate use.

3. The system of claim 2, wherein the processor is further configured to reserve the charging point for use by the chargeable vehicle following acceptance of charging point usage.

4. The system of claim 1, wherein the processor is further configured to add the vehicle to a queue for charging point usage upon acceptance of the option to receive notification.

5. The system of claim 4, wherein the processor is configured to prioritize the queue based on priorities associated with various vehicles within the queue.

6. The system of claim 4, wherein the processor is configured to notify all vehicles within the queue when the charging point is available for use.

7. The system of claim 4, wherein the processor is configured to notify a next-vehicle in the queue when the charging point is available for use.

8. A system comprising:
a processor configured to:
manage a queue of entities designated to receive notification when a charging point within the queue is available for use;
notify an entity in the queue when the charging point is determined to be available for use;
receive acceptance of charging point usage from the notified entity;
reserve the charging point, for a limited time-period, for use by the notified entity upon receipt of the acceptance;
receive updated GPS coordinates corresponding to the notified entity; and
extend the limited time-period based on an indication, determined by the updated GPS coordinates, that the notified entity is attempting to use the charging point.

9. The system of claim 8, wherein the processor is configured to reserve the charging point for a limited period of time.

10. The system of claim 9, wherein the processor is configured to receive updated GPS coordinates corresponding to the notified entity and to extend the limited period of time based on an indication, determined by the updated GPS coordinates, that the notified entity is attempting to use the charging point.

11. The system of claim 8, wherein the processor is configured to:
notify multiple entities in the queue at the same time when the charging point is available for use; and
reserve the charging point for use by a first-responding entity that was first to respond with acceptance of charging point usage.

12. The system of claim 11, wherein the processor is configured to notify other non-first-responding entities of the notified entities upon receipt of acceptance from the first-responding entity.

13. A system comprising:
a processor configured to:
- establish communication between a beacon-detecting device and a beacon, one of which identifies a charging entity and the other of which identifies a charging point;
- determine that the entity is attempting to use the charging point, based on the communication;
- verify the entity as permitted to use the charging point based on a preassigned association;
- notify the entity and offer to add the entity to a queue, when verification fails.

14. The system of claim 13, wherein the beacon is provided in conjunction with the charging point and the beacon-detecting device is provided in conjunction with a vehicle.

15. The system of claim 13, wherein the beacon-detecting device is provided in conjunction with a vehicle and the beacon-detecting device is provided in conjunction with the charging point.

* * * * *